(12) United States Patent  
Scroggie et al.

(10) Patent No.: US 9,404,519 B2  
(45) Date of Patent: Aug. 2, 2016

(54) COMPENSATING POSITION ROOF DITCH MOLDING RETAINER

(71) Applicant: ILLINOIS TOOL WORKS INC., Glenview, IL (US)

(72) Inventors: Derek Scroggie, Macomb, MI (US); Robert Osterland, East China, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/223,554

(22) Filed: Mar. 24, 2014

(65) Prior Publication Data

US 2014/0201957 A1 Jul. 24, 2014

Related U.S. Application Data

(62) Division of application No. 12/934,524, filed as application No. PCT/US2009/041872 on Apr. 28, 2009, now Pat. No. 8,677,572.

(60) Provisional application No. 61/059,574, filed on Jun. 6, 2008.

(51) Int. Cl.
*F16B 5/12* (2006.01)
*B60R 13/04* (2006.01)
(Continued)

(52) U.S. Cl.
CPC ................. *F16B 5/123* (2013.01); *B60R 13/04* (2013.01); *B60R 13/06* (2013.01); *B60R 13/07* (2013.01); *Y10T 24/303* (2015.01); *Y10T 24/309* (2015.01); *Y10T 24/45105* (2015.01)

(58) Field of Classification Search
CPC ......... F16B 5/123; B60R 13/06; B60R 13/04; B60R 13/07; Y10T 24/45105; Y10T 24/309; Y10T 24/303
See application file for complete search history.

(56) References Cited

U.S. PATENT DOCUMENTS

| 4,792,180 | A | | 12/1988 | Jacobsen et al. |
| 5,013,083 | A | | 5/1991 | Yada et al. |
| 5,413,398 | A | * | 5/1995 | Kim .............................. 296/210 |

(Continued)

FOREIGN PATENT DOCUMENTS

| DE | 10356382 A1 | 7/2005 |
| DE | 102005042244 A1 | 4/2006 |

(Continued)

OTHER PUBLICATIONS

ISR for PCT/US2009/041872 mailed Sep. 28, 2009.

*Primary Examiner* — Robert J Sandy
*Assistant Examiner* — Louis Mercado
(74) *Attorney, Agent, or Firm* — Hauptman Ham LLP

(57) ABSTRACT

A retainer adapted for disposition within a vehicle roof ditch between a first sidewall and a second sidewall to hold an elongate molding strip in covering relation to the vehicle roof ditch. The retainer includes at least one body portion adapted for disposition within the roof ditch in operative connection to a base portion of the roof ditch. The body portion has a length dimension adapted for orientation along a length segment of the roof ditch between a first sidewall and a second sidewall. The body portion includes an arrangement of molding attachment elements adapted to engage an underside of the elongate molding strip and at least one spring biasing leg disposed at an elevation below the molding attachment elements, which extends an operative length away from one side of the body portion.

25 Claims, 4 Drawing Sheets

(51) Int. Cl.
*B60R 13/06* (2006.01)
*B60R 13/07* (2006.01)

(56) References Cited

U.S. PATENT DOCUMENTS

| | | |
|---|---|---|
| 5,575,527 A | 11/1996 | Pfister |
| 5,829,825 A | 11/1998 | Kim |
| 6,530,130 B2 | 3/2003 | Rosemann |
| 6,564,433 B2 | 5/2003 | Nagasawa |
| 6,668,430 B2 | 12/2003 | Ichimaru |
| 6,695,397 B2 | 2/2004 | Kamiya |
| 6,877,798 B2 | 4/2005 | Nakajima |
| 7,004,535 B1 | 2/2006 | Osterberg et al. |
| 7,029,060 B1 | 4/2006 | Osterberg et al. |
| 8,020,354 B2 | 9/2011 | Scroggie et al. |
| 2002/0073515 A1 | 6/2002 | Rosemann |
| 2002/0101096 A1 | 8/2002 | Nagasawa |
| 2006/0049322 A1 | 3/2006 | Hirano et al. |
| 2009/0179459 A1 | 7/2009 | Regensburger et al. |

FOREIGN PATENT DOCUMENTS

| | | |
|---|---|---|
| DE | 102006039577 B3 | 1/2008 |
| GB | 2434616 A | 8/2007 |
| JP | 2002193050 A | 7/2002 |
| WO | 2007/107968 | 9/2007 |

* cited by examiner

COMPENSATING POSITION ROOF DITCH MOLDING RETAINER

CROSS REFERENCE TO RELATED APPLICATIONS

The present non-provisional United States Patent Application is a divisional of U.S. patent application Ser. No. 12/934,524, having a 371(c) date of Sep. 24, 2010, now U.S. Pat. No. 8,677,572, which is a national phase of International Application Number PCT/US2009/041872 filed Apr. 28, 2009, and claims the benefits of U.S. Provisional Application 61/059,574 filed Jun. 6, 2008, the contents of all of these applications are incorporated herein in their entirety.

FIELD OF THE INVENTION

The present invention relates generally to a fastening system adapted to facilitate attachment and retention of a molding strip across a roof ditch depression disposed between a roof panel and a body side panel of a vehicle. The invention is more particularly directed to a fastening system incorporating structures adapted to urge a retained molding strip generally towards a preselected side of the roof ditch depression to maintain proper orientation of the molding strip. The fastening system may incorporate a one-piece or a multi-piece retainer adapted for riveted or other connection at a base of a roof ditch depression.

BACKGROUND OF THE INVENTION

In the construction of automobiles or other transportation vehicles there is often an elongate depression formed at the interface between the roof panel and the adjacent body side panel. This depression is commonly referred to as a "roof ditch." These roof ditches are typically covered by placing a molding strip within the depression to at least partially span the distance between the roof panel and the body side panel. The molding strip is held in place by a retainer element which interfaces with the molding and which is secured to the base of the ditch.

The roof ditch may have a degree of variation along its length. This variation may be in both depth and in width. The molding strips typically include a flexible edge that conforms to the opposing sidewall of the roof ditch. However, due to the flexible nature of the molding strip edge material, the molding strip may nonetheless shift in the direction transverse to the sidewalls. In an extreme case, a gap may open up between the molding strip and an opposing sidewall of the roof ditch. Accordingly, it would be desirable to provide a molding attachment system that promotes proper placement and retained orientation of the molding strip within the roof ditch.

SUMMARY OF THE INVENTION

The present invention provides advantages and alternatives over the prior art by providing retainer elements adapted for operative attachment to the base of a roof ditch and which engage an overlying molding strip. The retainer elements selectively urge the molding strip generally towards a preselected side of the roof ditch depression so as to automatically compensate for variations in initial placement and/or roof ditch width. The retainer elements may also compensate for variations in roof ditch depth. The retainer elements may be of multi-piece or single piece construction.

According to one aspect, the present invention provides a retainer adapted for disposition within a vehicle roof ditch between a first sidewall and a second sidewall to hold an elongate molding strip in covering relation to the vehicle roof ditch. The retainer includes at least one body portion adapted for disposition within the roof ditch in operative connection to a base portion of the roof ditch. The body portion has a length dimension adapted for orientation along a length segment of the roof ditch between a first sidewall and a second sidewall. The body portion includes an arrangement of molding attachment elements adapted to engage an underside of the elongate molding strip. The body portion further includes at least one spring biasing leg disposed at an elevation below the molding attachment elements, the spring biasing leg extends an operative length away from one side of the body portion for contacting, flexing relation with the first sidewall. The spring biasing leg continuously urges the body portion away from the first sidewall and towards the second sidewall.

According to another aspect, the present invention provides a multi-piece retainer adapted for disposition within a vehicle roof ditch between a first sidewall and a second sidewall to hold an elongate molding strip in covering relation to the roof ditch. The retainer includes a base attachment element adapted for operative attachment to a base portion of the roof ditch. The base attachment element includes at least one male attachment member projecting upwardly from the base attachment element in a direction away from the base portion of the roof ditch. The retainer further includes a strip attachment element adapted for operative attachment to an underside of the elongate molding strip. The strip attachment element includes at least one window opening adapted to receive the male attachment member in snap-fit relation. The strip attachment element includes an arrangement of molding attachment elements adapted to engage an underside of the elongate molding strip. The strip attachment element further includes at least one spring biasing leg disposed at an elevation below the molding attachment elements. The spring biasing leg extends an operative length away from one side of the strip attachment element for contacting, flexing relation with the first sidewall. The spring biasing leg continuously urges the strip attachment element away from the first sidewall and towards the second sidewall. The multi-piece retainer also facilitates controlled insertion and removal of the individual pieces without reliance on build variation and burr conditions of a molded strip opening. This may aid in insertion and subsequent servicing.

According to still another aspect, the present invention provides a single-piece retainer adapted for disposition within a vehicle roof ditch between a first sidewall and a second sidewall to hold an elongate molding strip in covering relation to the vehicle roof ditch. The retainer includes a body portion disposed within the roof ditch and operatively attached to a base portion of the roof ditch. The body portion is of unitary construction and has a length dimension adapted for orientation along a length segment of the roof ditch between the first sidewall and the second sidewall. The body portion includes an arrangement of molding attachment elements adapted to engage an underside of the elongate molding strip in snap-fit relation. The body portion further includes at least one spring biasing leg disposed at an elevation below the molding attachment elements. The spring biasing leg extends an operative length away from one side of the body portion for contacting, flexing relation with the first sidewall. The spring biasing leg continuously urges the body portion away from the first sidewall and towards the second sidewall.

Other features and advantages of the invention will become apparent to those skilled in the art upon review of the following detailed description, claims and drawings in which like numbers are used to designate like features.

Figure 1:
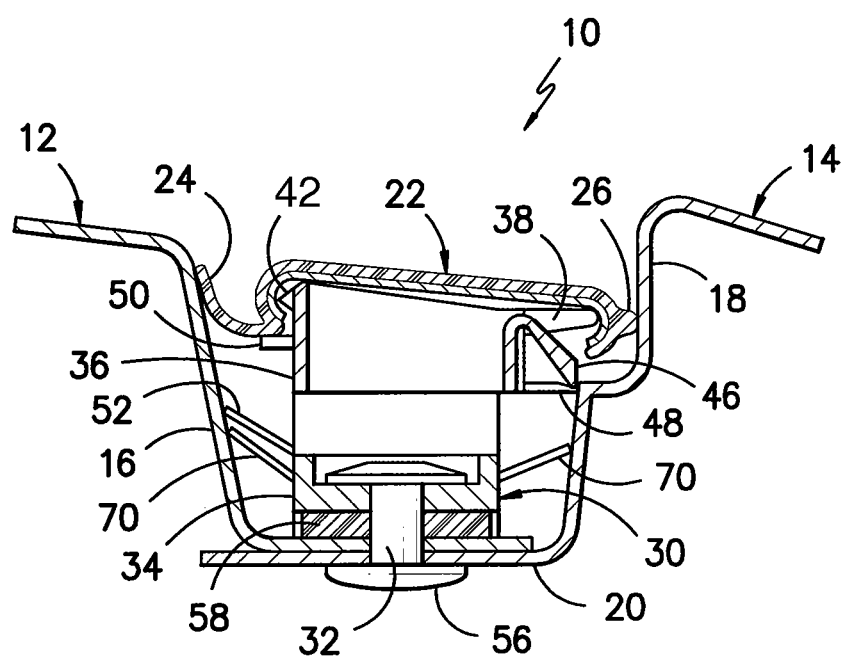
FIG. 1 is a cut-away schematic view of one exemplary embodiment of a molding retainer engaging a molding strip within a roof ditch.

Before the embodiments of the intention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENTS

Reference will now be made to the drawings, wherein like elements are designated by like reference numerals in the various views. FIG. 1 illustrates a roof ditch 10 formed at the intersection of a vehicle roof panel 12 and side panel 14. In this regard, the roof ditch 10 will typically substantially along the roof line of the vehicle. In the illustrated arrangement, the roof ditch 10 has a depressed cross-sectional profile including an inboard sidewall 16 and an outboard sidewall 18. The inboard sidewall 16 and the outboard sidewall 18 typically are formed from steel sheet stock or other suitable structural material. The roof ditch 10 also includes a base 20 formed by the overlapping relation of the sheet materials making up the inboard sidewall 16 and the outboard sidewall 18.

In the arrangement illustrated in FIG. 1, a molding strip 22 extends substantially along the length of the roof ditch 10. The width dimension of the molding strip 22 extends between the inboard sidewall 16 and the outboard sidewall 18 so as to substantially cover the underlying interior of the roof ditch 10. As best illustrated through joint reference to FIGS. 1 and 2, the molding strip 22 includes a pliable lateral edge flap 24 extending along one lateral edge and an outwardly projecting lateral rib 26 running along the opposing lateral edge. In use, the lateral edge flap is disposed in deformed conforming relation against one of the sidewalls while the lateral rib 26 is disposed in abutting relation against the opposing sidewall. By way of example only, in the illustrated arrangement, the pliable lateral edge 24 is disposed against the inboard sidewall 16 with the lateral rib 26 abutting against the outboard sidewall 18. However, this relationship can be reversed if desired. Moreover, the construction of the molding strip may take on any alternative configuration as may be desired and useful.

In the illustrated arrangement, the molding strip 22 is secured in place across the roof ditch 10 by a retainer 30 held by a rivet 32 or other attachment mechanism at the base 20. Referring jointly to FIGS. 1-4, in the exemplary construction the retainer 30 is multi-piece construction including a base attachment element 34 adapted to be held at the base 20 of the roof ditch 10 and a strip attachment element 36 adapted for snap-in attachment across the underside of the molding strip 22. As seen, the base attachment element 34 and the strip attachment element 36 each have a length dimension adapted to extend in aligned relation along a length segment of the roof ditch 10. The base attachment element 34 and the strip attachment element 36 also have a width dimension adapted to extend at least partially across the width of the roof ditch. In the illustrated construction, the base attachment element 34 and the strip attachment element 36 are adapted to be snapped together during final assembly. The base attachment element 34 and the strip attachment element 36 may be formed of materials such as molded plastic or the like, although other materials of construction may likewise be utilized if desired.

Figure 2:
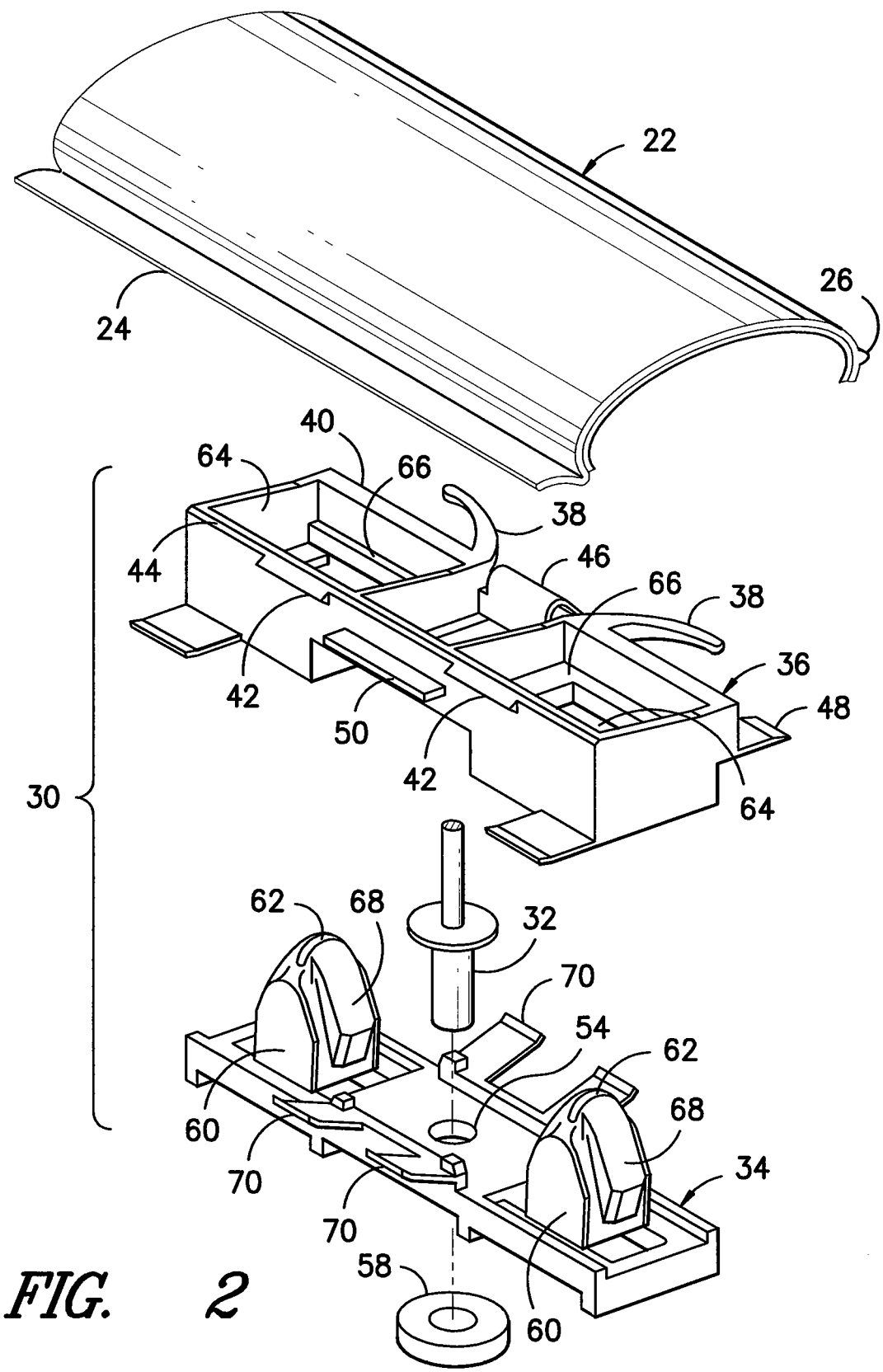
FIG. 2 is an exploded assembly view of the molding retainer and molding strip of FIG. 1.
Figure 3:
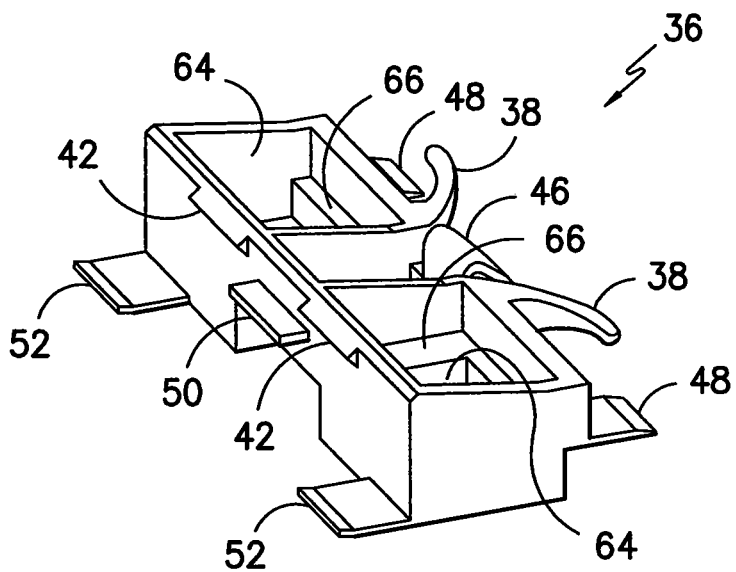
FIG. 3 is an elevation perspective view of a male base portion of the molding retainer of FIG. 1.
Figure 4:
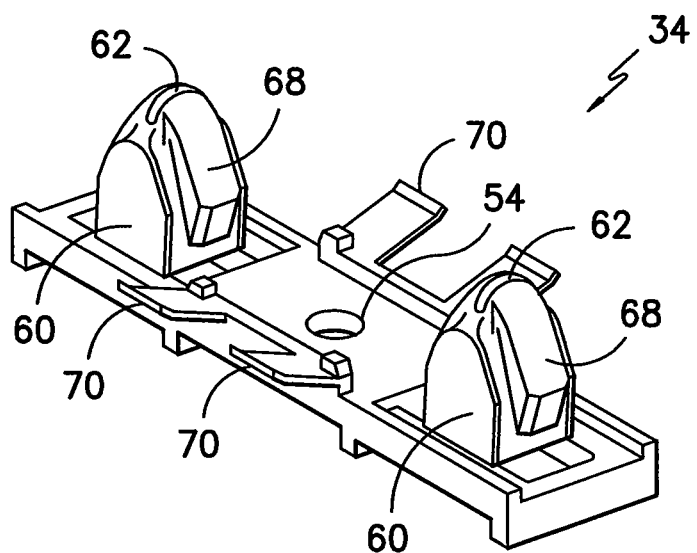
FIG. 4 is an elevation perspective view of a female molding engagement portion of the molding retainer of FIG. 1.

Referring now particularly to FIGS. 1-3, in the exemplary construction the strip attachment element 36 includes a pair of outwardly extending curved projections 38 defining diverging partial arcs. As shown, the proximal ends of the curved projections are spaced apart from one another at positions along a first lateral edge 40 of the strip attachment element. The curved projections 38 extend away from the first lateral edge along generally opposing paths such that distal ends of the curved projections project generally away from one another towards opposite ends of the strip attachment element to form a so called "bull horn" configuration.

In the exemplary construction, a pair of edge projections 42 having downwardly angled upper surfaces extend away from a second lateral edge 44 in generally opposing relation to the first lateral edge 40. In assembly, the curved projections 38 are placed in position against an interior edge of the molding strip 22. In this state, the curved projections can be compressed as the opposing edge of the molding strip 22 is pushed in a snap-fit relation over the edge projections 42. Thereafter, the outward biasing spring action of the curved projections acts to hold the strip attachment element 36 in place relative to the molding strip 22.

In the illustrated arrangement, a downwardly extending hook tab 46 is disposed between the proximal ends of the curved projections 38. The hook tab 46 may fit into a cooperating engagement slot in the molding strip 22 disposed at a pre-defined position along the length of the molding strip 22 to facilitate proper longitudinal placement of the retainer. In addition to the hook tab 46, the exemplary strip attachment element 36 also includes an arrangement of anti-rotation tabs 48 are at an elevation below the curved projections 38 and the hook tab 46. The anti-rotation tabs 48 aid in preventing rotation within the roof ditch following insertion. In the exemplary construction, the strip attachment element 36 also includes an outwardly projecting platform element 50 disposed at a position generally below and between the edge projections 42. As best seen in FIG. 1, the platform element 50 defines a stop surface for the molding strip 22. The platform element 50 also provides underlying support for the pliable lateral edge flap 24 when the edge flap is folded against the opposing sidewall.

As shown, the exemplary construction of the strip attachment element 36 also includes a pair of spring biasing legs 52 extending away from one side. In the arrangement illustrated in FIG. 1, the spring biasing legs 52 are in the form of extended leaf springs having upwardly angled distal edges to facilitate upward bending. However, other bendable constructions such as extended rods or the like may be used if desired. As shown, upon insertion into the roof ditch 10, the spring biasing legs are compressed against an opposing sidewall of the roof ditch 10 at a position below the pliable lateral edge 24 of the molding strip 22. In this condition, the spring biasing legs 52 urge the molding strip 22 in a direction such that the lateral rib 26 is pressed against the opposing sidewall. This biasing action aids in compensating for variations in the width of the roof ditch. Importantly, it is to be understood that while FIG. 1 illustrates the spring biasing legs 52 as pushing against the inboard sidewall 16 so as to urge the molding strip 22 towards the side panel 14, the arrangement may likewise be reversed if desired such that the spring biasing legs 52 push against the outboard sidewall 18 so as to urge the molding strip 22 towards the roof 12.

As noted previously, the two-piece retainer 30 illustrated in FIG. 1 also includes a base attachment element 34 adapted for placement at the base 20 of the roof ditch 10. As may be seen through joint reference to FIGS. 1, 2 and 4, the base attachment element 34 may be secured in place by a rivet 32 that extends through an acceptance opening 54 in the in the base attachment element 34 and an aligned opening in the base 20. A portion of the rivet 32 is expanded to form a sealing button 56 below the base 20 in a manner as will be well known to those of skill in the art. In the illustrated arrangement, a seal 58 of rubber or the like may be positioned between the base attachment element 34 and the base 20 to aid in preventing intrusion of noise, dust, water and/or vapors.

As shown, the base attachment element 34 includes a pair of inwardly compressible male attachment towers 60. The attachment towers 60 include a compression gap 62 which permits the attachment towers to compress inwardly slightly towards a central axis when pressure is applied. In the assembly process, the attachment towers 60 are pushed through aligned window openings 64. The window openings include reduced shelf shoulder portions 66 that compress angled wing portions 68 inwardly towards a central axis during insertion. While only a single angled wing portion is shown on each attachment tower, according to one potentially desirable arrangement, a corresponding wing portion also is disposed across the opposing surface which is not shown. However, it is likewise contemplated that the attachment towers 60 may each include a single angled wing portion if desired. In a construction wherein the attachment towers 60 include single wing portions, the wing portions may project generally towards one another from opposing surfaces of the towers facing generally inwardly towards the acceptance opening 54. Alternatively, the single wing portions may project generally away from one another from surfaces of the towers facing outwardly away from the acceptance opening 54. Regardless of the arrangement of the angled wing portions, once the angled wing portions have been pushed past the shoulder portions 66, the compressive force applied by the shoulder portions 66 is released and the angled wing portions 68 snap back into place behind the upper surface of the shoulder portions. In this condition, the attachment towers 60 are blocked against removal through the window openings 64.

According to one contemplated assembly practice, the base attachment element 34 is placed into the roof ditch 10 in overlying relation to a rivet acceptance opening (not shown) in the base 20. As shown, the base attachment element 34 may include an arrangement of flexible tabs 70 extending away from opposing lateral sides to aid in avoiding a skewed orientation within the roof ditch. Once the desired position has been achieved, the base attachment element 34 may be secured in place by riveting or other suitable attachment techniques as may be desired. Thereafter, the strip attachment element 36 with the attached molding strip 22 may be pushed downwardly over the aligned attachment towers 60 to assume the condition as shown in FIG. 1 in which the spring biasing legs 52 continuously urge the strip attachment element 36 and the attached molding strip towards a side of the roof ditch away from the spring biasing legs.

Figure 5:
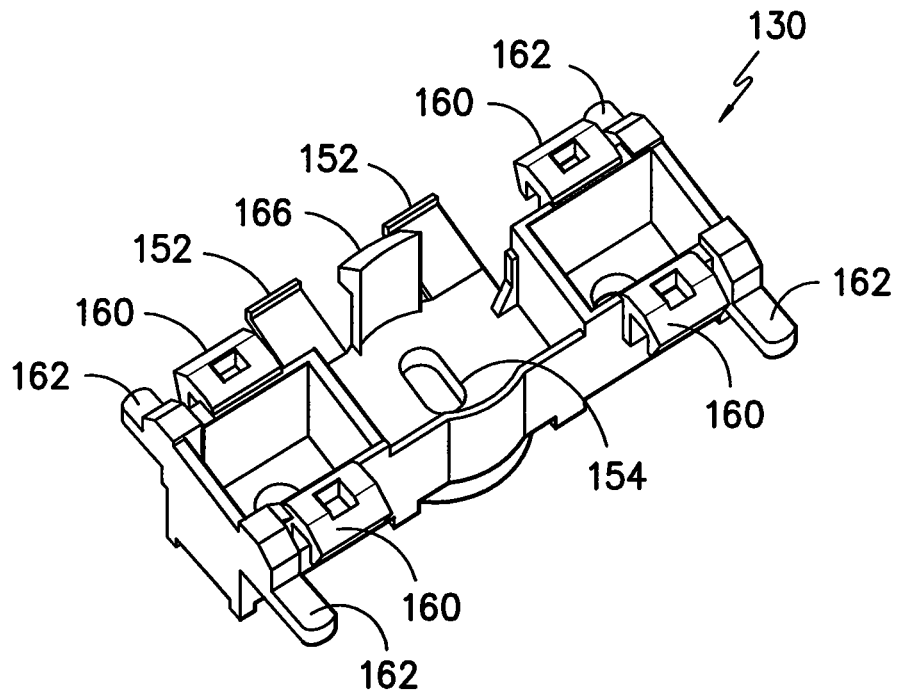
FIG. 5 is an elevation perspective view of an exemplary single-piece molding retainer in accordance with the present invention.
Figure 6:
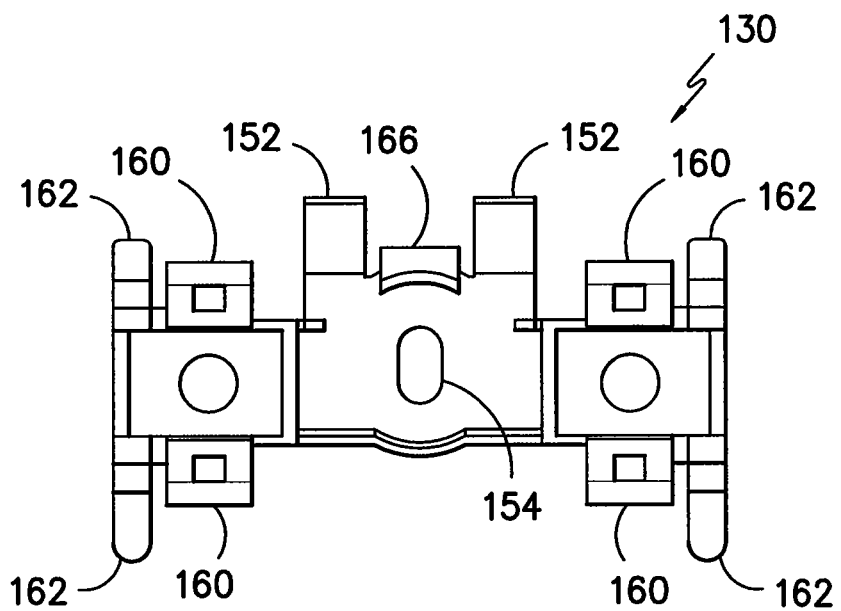
FIG. 6 is an elevation plan view of the single-piece molding retainer of FIG. 5.

While a multi-piece design for the retainer 30 may have a number of benefits, a single piece retainer may likewise be used if desired. By way of example only, an exemplary single piece retainer 130 is illustrated in FIGS. 5 and 6. The single piece retainer 130 may be formed from molded plastic or other suitable material and is adapted to reside within a roof ditch (not shown) as previously described in relation to the base attachment element 34 in the two-piece design. Specifically, the single piece retainer 130 includes an acceptance opening 154 adapted to receive a rivet in pass-through relation to an underlying base of the roof ditch. As shown, in the illustrated construction the acceptance opening is of a generally oval shape positioned such that the major axis of the oval is oriented generally transverse to the length dimension of the roof ditch. As will be described further hereinafter, such an oval or other elongate opening facilitates a degree of movement by the retainer 130 across the width of the roof ditch following installation.

The illustrated single piece retainer 130 includes an arrangement of angled clip elements 160 having outwardly projecting noses extending away from upper lateral edges. As will be appreciated, a molding strip 22 as previously described in relation to FIG. 1 may be press-fit over the clip elements 160. Specifically, as the edges of the molding strip 22 are pressed downwardly against the upper angled surfaces of the clip elements 160, the clip elements flex downwardly and then spring back into place behind inwardly projecting interior edge surfaces of the molding strip thereby holding the molding strip in place. Stop platforms 162 are disposed longitudinally outboard from the clip elements 160 generally at each corner of the single piece retainer 130. The stop platforms 162 are positioned at an elevation slightly below the clip elements 160 and act to limit the downward movement of the molding strip.

In the illustrated single piece retainer 130, an elevated positioning post 166 is disposed at a substantially mid-point location along one lateral side. The positioning post 166 is positioned so as to engage a corresponding positioning slot on the molding strip (not shown) to aid in placement of the single piece retainer at a predefined longitudinal position along the molding strip.

As shown, spring biasing legs 152 extend away from one lateral side of the single piece retainer 130. The spring biasing legs 152 are positioned at an elevation generally below the adjacent clip elements 160 and stop platforms 162. As best seen in FIG. 6, the spring biasing legs 152 project outwardly a distance exceeding the length of the adjacent clip elements 160 and stop platforms 162. Using this arrangement, the spring biasing legs 152 engage an opposing sidewall of the roof ditch and continuously urge the single piece retainer 130 and any attached molding strip towards the far sidewall. As previously noted, the use of an oval, a slot or other elongate geometry rivet acceptance opening 154 facilitates any desired lateral movement of the single piece retainer 130 in response to the urging force provided by the spring biasing legs. Specifically, due to the slightly elongated nature of the rivet acceptance opening 154, a slight lateral sliding adjustment may take place to provide lateral adjustment.

In the arrangement illustrated in FIGS. 5 and 6, the spring biasing legs 152 are in the form of extended leaf springs having upwardly angled distal edges to facilitate upward bending. However, other bendable constructions such as extended rods or the like may be used if desired. It is to be understood that the spring biasing legs 152 may be located on either side of the single piece retainer 130. Likewise, the positioning post 166 may be located on either side of the single piece retainer 130. Thus, the spring biasing legs 152 and the positioning post 166 may be on the same side or on different sides from one another as may be desired. Moreover, the positioning post 166 may be eliminated entirely if desired. As will be appreciated, the positioning post 166 acts in substantially the same manner as the hook tab 46 previously described in relation to the multi-piece construction so as to position the retainer at a defined position along the length of the molding strip in relation to the roof ditch.

In use, the single piece retainer 130 as described may be positioned across a base portion of a roof ditch and held in place by a rivet connection. Thereafter, a molding strip 22 (FIG. 1) may be press-fit over the clip elements 160 and held in place. The spring biasing legs 152 act against an opposing sidewall of the roof ditch and continuously urge the single piece retainer 130 and attached molding strip towards a far sidewall.

As will be appreciated, both the multi-piece retainer 30 and the single piece retainer 130 provide a simple mechanism for attachment of a molding strip across a roof ditch. Moreover, such attachment may be carried out by application of a relatively straight pushing force without the need for rolling or sliding action to make the connection. Such straight-line connection by application of a substantially vertical pushing force may simplify the attachment process.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A retainer adapted for disposition within a vehicle roof ditch between a first sidewall and a second sidewall and to hold an elongate molding strip in covering relation to the vehicle roof ditch, the retainer comprising:
    at least one body portion adapted for disposition within the roof ditch in operative connection to a base portion of the roof ditch, the body portion having a first lateral side, a second lateral side and a length dimension adapted for orientation along a length segment of the roof ditch between the first sidewall and the second sidewall of the roof ditch, the body portion including an arrangement of molding attachment elements adapted to retainingly engage an underside of the elongate molding strip, the body portion further including at least one spring biasing leg disposed at an elevation below the molding attachment elements, the spring biasing leg extending an operative length away from the first lateral side of the body portion for contacting, in a flexing relation, the first sidewall, such that the spring biasing leg continuously urges the body portion away from the first sidewall and towards the second sidewall;
    an elevated positioning post is disposed along one of the first or the second lateral sides; and
    at least one stop platform adapted to limit downward movement of the molding strip,
    wherein the stop platform and the spring biasing leg commonly extend away from a side of the body portion.

2. The retainer as recited in claim 1, wherein the arrangement of molding attachment elements comprises a plurality of angled clip elements disposed along upper lateral edges of the body portion.

3. The retainer as recited in claim 2, wherein the body portion has a substantially rectangular box shape, and wherein angled clip elements are disposed adjacent upper corners of the body portion.

4. The retainer as recited in claim 1, wherein the stop platform extends outwardly from the body portion at an elevation between the molding attachment elements and the spring biasing leg.

5. The retainer as recited in claim 1, wherein a plurality of stop platforms extend away from the first and the second lateral sides of the body portion.

6. The retainer as recited in claim 1, wherein a plurality of spring biasing legs extend away from the first lateral side of the body portion.

7. The retainer as recited in claim 6, wherein the spring biasing legs define leaf springs having upwardly angled distal edges that are formed on extensions of the spring biasing legs that extend in at least about a normal direction away from a direction of extension of the spring biasing legs.

8. The retainer as recited in claim 1, further including at least one stop platform adapted to limit downward movement of the molding strip, the stop platform extending outwardly from the body portion at an elevation between a location where the molding attachment elements attach to the molding strip and the spring biasing leg contacts the first sidewall.

9. The retainer as recited in claim 1, further including at least one stop platform adapted to limit downward movement of the molding strip, the stop platform extending in an elongate manner outwardly from the body portion having an end separate from an end of all of the spring biasing legs and separate from an end of all molding attachment elements.

10. The retainer as recited in claim 1, wherein the stop platform and the spring biasing leg extend away from the first lateral side of the body portion in a direction at least about normal to a longitudinal axis of the at least one body portion.

11. The retainer as recited in claim 1, wherein a plurality of stop platforms extend away from each of the first and second lateral sides of the body portion in a direction at least about normal to the respective lateral sides.

12. The retainer as recited in claim 1, wherein a plurality of spring biasing legs extend away from the first lateral side of the body portion in a direction at least about normal to the first lateral side.

13. The retainer as recited in claim 1, wherein the at least one body portion is a monolithic component.

14. The retainer as recited in claim 1, wherein the second lateral side of the body portion does not have any spring biasing legs.

15. The retainer as recited in claim 14, wherein the body portion is a monolithic component.

16. The retainer as recited in claim 1, wherein the spring biasing leg extends at a substantially orthogonal manner relative to the first lateral side of the body portion when in an undeformed state.

17. The retainer as recited in claim 1, wherein the spring biasing leg has a cross-section having a height that is substantially smaller than a length of the cross-section.

18. A device, comprising:
a single-piece retainer adapted for disposition within a vehicle roof ditch between a first sidewall and a second sidewall to hold an elongate molding strip in covering relation to the vehicle roof ditch, the retainer including:
a body portion adapted to be disposed within the roof ditch and operatively attached to a base portion of the roof ditch, the body portion being of unitary construction and having a length dimension adapted for orientation along a length segment of the roof ditch between the first sidewall and the second sidewall, the body portion including an arrangement of molding attachment elements adapted to engage an underside of the elongate molding strip in snap-fit relation, the body portion further including at least one spring biasing leg disposed at an elevation below the molding attachment elements, said at least one spring biasing leg extending an operative length away from a first lateral side of the body portion for contacting, flexing relation with the first sidewall, such that said at least one spring biasing leg continuously urges the body portion away from the first sidewall and towards the second sidewall,
wherein the body portion includes a rivet opening adapted for passage of a rivet between the body portion and the base portion of the roof ditch.

19. The retainer as recited in claim 18, wherein the rivet opening is of an elongate geometry oriented with a major axis transverse to the length dimension of the body portion.

20. The retainer as recited in claim 19, wherein the rivet opening is an oval.

21. The retainer as recited in claim 18, wherein a second lateral side of the body portion does not have any spring biasing legs.

22. The retainer as recited in claim 21, wherein the body portion is a monolithic component.

23. The retainer as recited in claim 18, wherein the spring biasing leg extends at a substantially orthogonal manner relative to the first lateral side of the body portion when in an undeformed state.

24. The retainer as recited in claim 18, wherein the spring biasing leg has a cross-section having a height that is substantially smaller than a length of the cross-section.

25. The retainer as recited in claim 18, wherein the body portion is adapted for disposition within the roof ditch in operative mechanical connection to a base portion of the roof ditch.

* * * * *